US008983201B2

(12) United States Patent
Cai et al.

(10) Patent No.: US 8,983,201 B2
(45) Date of Patent: Mar. 17, 2015

(54) THREE-DIMENSIONAL VISUAL PHRASES FOR OBJECT RECOGNITION

(75) Inventors: Rui Cai, Beijing (CN); Zhiwei Li, Beijing (CN); Lei Zhang, Beijing (CN); Qiang Hao, Tianjin (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 134 days.

(21) Appl. No.: 13/561,718

(22) Filed: Jul. 30, 2012

(65) Prior Publication Data
US 2014/0029856 A1    Jan. 30, 2014

(51) Int. Cl.
G06K 9/46        (2006.01)
G06K 9/66        (2006.01)

(52) U.S. Cl.
CPC .............. G06K 9/4676 (2013.01); G06K 9/469 (2013.01)
USPC ......................................... 382/195

(58) Field of Classification Search
CPC ............ G06K 9/4671; G06K 9/00664; G06K 9/4676; G06K 9/00208; G06K 9/00288; G06T 3/4038; G06T 5/50; G06T 1/0007; G06T 1/00; G06N 3/08; G06F 17/3053
See application file for complete search history.

(56) References Cited

U.S. PATENT DOCUMENTS

| 7,587,082 | B1 | 9/2009 | Rudin et al. | |
|---|---|---|---|---|
| 8,073,818 | B2 * | 12/2011 | Duan et al. | 707/687 |
| 8,463,756 | B2 * | 6/2013 | Sarshar et al. | 707/690 |
| 8,504,495 | B1 * | 8/2013 | Baluja et al. | 706/12 |
| 2003/0067461 | A1 | 4/2003 | Fletcher et al. | |
| 2006/0039600 | A1 | 2/2006 | Solem et al. | |
| 2007/0110338 | A1 * | 5/2007 | Snavely et al. | 382/305 |
| 2007/0185946 | A1 * | 8/2007 | Basri et al. | 708/200 |
| 2008/0310757 | A1 * | 12/2008 | Wolberg et al. | 382/285 |
| 2009/0060351 | A1 * | 3/2009 | Li et al. | 382/224 |
| 2009/0096790 | A1 | 4/2009 | Wiedemann et al. | |
| 2009/0175538 | A1 * | 7/2009 | Bronstein et al. | 382/173 |
| 2009/0185746 | A1 * | 7/2009 | Mian et al. | 382/209 |
| 2010/0074528 | A1 * | 3/2010 | Hu et al. | 382/190 |
| 2010/0088295 | A1 * | 4/2010 | Duan et al. | 707/705 |
| 2010/0169576 | A1 * | 7/2010 | Chen | 711/122 |
| 2011/0115921 | A1 * | 5/2011 | Wang et al. | 348/187 |
| 2012/0177284 | A1 * | 7/2012 | Wang | 382/154 |
| 2013/0155058 | A1 * | 6/2013 | Golparvar-Fard et al. | 345/419 |
| 2013/0202213 | A1 * | 8/2013 | Adamek et al. | 382/201 |

FOREIGN PATENT DOCUMENTS

WO    WO 2012156774 A1 * 11/2012

OTHER PUBLICATIONS

Johns et al., "From Images to Scenes: Compressing an Image Cluster into a Single Scene Model for Place Recognition", Nov. 2011, IEEE International Conference on Computer Vision, pp. 874-881.*
Gavves et al., "Landmark Image Retrieval Using Visual Synonyms" Oct. 2010, ACM, pp. 1123-1126.*

(Continued)

*Primary Examiner* — Vu Le
*Assistant Examiner* — Guillermo Rivera-Martinez
(74) *Attorney, Agent, or Firm* — Dan Choi; Judy Yee; Micky Minhas

(57) ABSTRACT

The techniques discussed herein discover three-dimensional (3-D) visual phrases for an object based on a 3-D model of the object. The techniques then describe the 3-D visual phrases. Once described, the techniques use the 3-D visual phrases to detect the object in an image (e.g., object recognition).

20 Claims, 6 Drawing Sheets

(56) References Cited

OTHER PUBLICATIONS

Arandjelovic et al., "Efficient image retrieval for 3D structures", BMVC 2010 Aberystwyth, Aug.-Sep. 2010, 11 pages.
Arya et al., "A Probabilistic Framework for Space Carving", Computer Vision, Eighth IEEE International Conference, Jul. 2001, 6 pages.
Cao et al., "Spatial-Bag-of-Features", Computer Vision and Pattern Recognition (CVPR), Jun. 2010, 8 pages.
Chum et al., "Geometric min-Hashing: Finding a (Thick) Needle in a Haystack", Computer Vision and Pattern Recognition, Jun. 2009, 8 pages.
David G. Lowe, "Distinctive Image Features from Scale-Invariant Keypoints", Internatioanl Journal of Computer Vision 60(2), 91-110, accepted Jan. 22, 2004, 20 pages.
Gordon et al., "What and Where: 3D Object Recognition with Accurate Pose", International Symposium on Mixed and Augmented Reality, Mar. 19, 2012, 16 pages.
Irschara et al., "From Structure-from-Motion Point Clouds to Fast Location Recognition", Computer Vision and Pattern Recognition, Jun. 2009, 8 pages.
Knopp et al., "Avoiding Confusing Features in Place Recognition", ECCV'10 Proceedings of the 11th European conference on Computer vision, Sep. 2010, 14 pages.
Kutulakos et al., "A Theory of Shape by Space Carving", The Proceedings of the Seventh IEEE International Conference, Sep. 1999, 20 pages.
Philbin et al., "Object Retrieval with Large Vocabularies and Fast Spatial Matching", Computer Vision and Pattern Recognition, Jun. 17-22, 2007, 8 pages.
Raguram et al., "Modeling and Recognition of Landmark Image Collections Using Iconic Scene Graphs", Proceedings of the 10th European Conference on Computer Vision, Oct. 2008, 28 pages.
Sattler et al., "Fast Image-Based Localization using Direct 2D-to-3D Matching", IEEE International Conference on Computer Vision, Nov. 2011, 8 pages.
Schindler et al., "City-scale Location Recognition", IEEE Computer Society Conference on Computer Vision and Pattern Recognition, Jun. 2007, 7 pages.
Shaiek et al., "3D Keypoint Detectors and Descriptors for 3D Objects Recognition with TOF Camera", Proceedings of SPIE, Nov. 1, 2011, 9 pages.
Sivic et al., "Video Google: A Text Retrieval Approach to Object Matching in Videos", Proceedings of the Ninth IEEE International Conference on Computer Vision, Oct. 13-16, 2003, 8 pages.
Snavely et al., "Location Recognition using Prioritized Feature Matching", ECCV'10 Proceedings of the 11th European conference, Sep. 2010, 14 pages.
Snavely et al., "Modeling the World from Internet Photo Collections", International Journal of Computer Vision, Nov. 2008, 22 pages.
Snavely et al., "Photo Tourism: Exploring Photo Collections in 3D", Microsoft Research, last updated on Aug. 20, 2008, 12 pages.
Wu et al., "3D Model Matching with Viewpoint-Invariant Patches (VIP)", IEEE Conference on Computer Vision and Pattern Recognition, Jun. 23, 2008, 8 pages.
Wu et al., "Detecting Large Repetitive Structures with Salient Boundaries", Proceedings of the 11th European conference on Computer, Nov. 2010, 14 pages.
Wu et al., "Multicore Bundle Adjustment", Proc. IEEE Conf. on Computer Vision and Pattern Recognition, Dec. 2011, 8 pages.
Yuan et al., "Discovery of Collocation Patterns: from Visual Words to Visual Phrases", Computer Vision and Pattern Recognition, Jun. 17-22, 2007, 8 pages.
Zhang et al., "Generating Descriptive Visual Words and Visual Phrases for Large-Scale Image Applications", IEEE Transactions on Image Processing, vol. 20, No. 9, Sep. 2011, 14 pages.
Zhang et al., "Image Retrieval with Geometry-Preserving Visual Phrases", Computer Vision and Pattern Recognition (CVPR), Jun. 20-25, 2011, 8 pages.
Zheng et al., "Tour the World: Building a Web-scale Landmark Recognition Engine", in Proc. CVPR, Sep. 2009, 8 pages.

\* cited by examiner

THREE-DIMENSIONAL VISUAL PHRASES FOR OBJECT RECOGNITION

BACKGROUND

As more and more digital images become electronically available via network storage and network communications (e.g., the Internet), recognizing objects in these digital images has also become more important. For example, object recognition in images may be relevant to image-based search queries and image retrieval, geo-localization applications, tourist guide applications and so forth.

At least some conventional approaches to object recognition use a process that seeks to match i) a query image with a known image of the object via scale-invariant feature transform (SIFT) techniques, or ii) the query image with a three-dimensional (3-D) image model developed from multi-view geometry techniques. In particular, these conventional approaches are based on matching individual points. However, image and/or object information conveyed by individual points is limited and lacks discriminating ability, which makes accurate object recognition difficult.

Therefore, the conventional approaches have developed to construct visual phrases (e.g., multiple points of an object) to preserve more discriminative information and improve object recognition. However, these visual phrases only consider co-occurrence statistics in a localized region of a two-dimensional (2-D) image plane of the query image, and therefore, the visual phrases are referred to as 2-D visual phrases. Consequently, the 2-D visual phrases are problematic for recognizing objects in images because the localized region associated with the 2-D visual phrases fails to consider projective transformations that occur due to viewpoint changes which result, for example, from a position from which a photo of the object was taken.

SUMMARY

The techniques discussed herein discover 3-D visual phrases for an object based on a 3-D model of the object. The techniques then describe the 3-D visual phrases by characterizing the visual appearance of the 3-D visual phrases and the geometric relationships of the 3-D visual phrases. Once described, the techniques use the 3-D visual phrases to detect the object in an image (e.g., object recognition).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, and/or technique(s) as permitted by the context above and throughout the document.

BRIEF DESCRIPTION OF THE CONTENTS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Overview

The following description sets forth techniques that perform object recognition by leveraging 3-D visual phrases. A 3-D visual phrase is a triangular facet on a surface of a reconstructed 3-D object model. Each triangular facet captures a spatial structure of the 3-D object model, and the triangular facets combined provide a full description of the object.

Accordingly, the techniques discussed herein discover 3-D visual phrases using a 3-D point cloud. The techniques then describe the 3-D visual phrases by characterizing the visual appearance of the 3-D visual phrases and the geometric relationships of the 3-D visual phrases. Once described, the techniques use the 3-D visual phrases to detect the object in an image (e.g., object recognition).

In contrast to conventional approaches that use 2-D visual phrases based on co-occurrence statistics in 2-D image planes, 3-D visual phrases characterize a spatial structure of a 3-D object. The characterized special structure improves the discriminative ability for object recognition because it is robust to projective transformations of the 3-D object due to viewpoint changes in different images comprising the 3-D object.

In various embodiments, the one or more objects being recognized are present in an image, the image being a photo captured by a camera in response to user input (e.g., a tourist snapping a picture of an established landmark). Accordingly, the object to be recognized in the image may be surrounded by image "noise" which is not related to the object (e.g., people walking, cars driving by, bikes locked up, etc.).

In various embodiments, the 3-D objects may be rigid objects. A rigid object is an object that is fairly consistent in structure, such as popular and well-known landmarks that are often photographed by tourists and that are frequently the focus of an image-based Web search (e.g., The White House, Big Ben, Leaning Tower of Pisa, Notre Dame de Paris, Eiffel Tower, Arc de Triomphe, etc.). A "face" of a person is not a rigid object because there is very little consistency from one person to another. While rigid objects may be fairly consistent in structure, they are still susceptible to transformation due to viewpoint changes, as previously discussed.

As previously mentioned, some conventional approaches to object recognition use a matching process based on 2-D visual phrases. A 2-D visual phrase is a combination of several visual "words" (e.g., interest points) which frequently co-occur with one another within a local region of a 2-D image plane.

Figure 1:
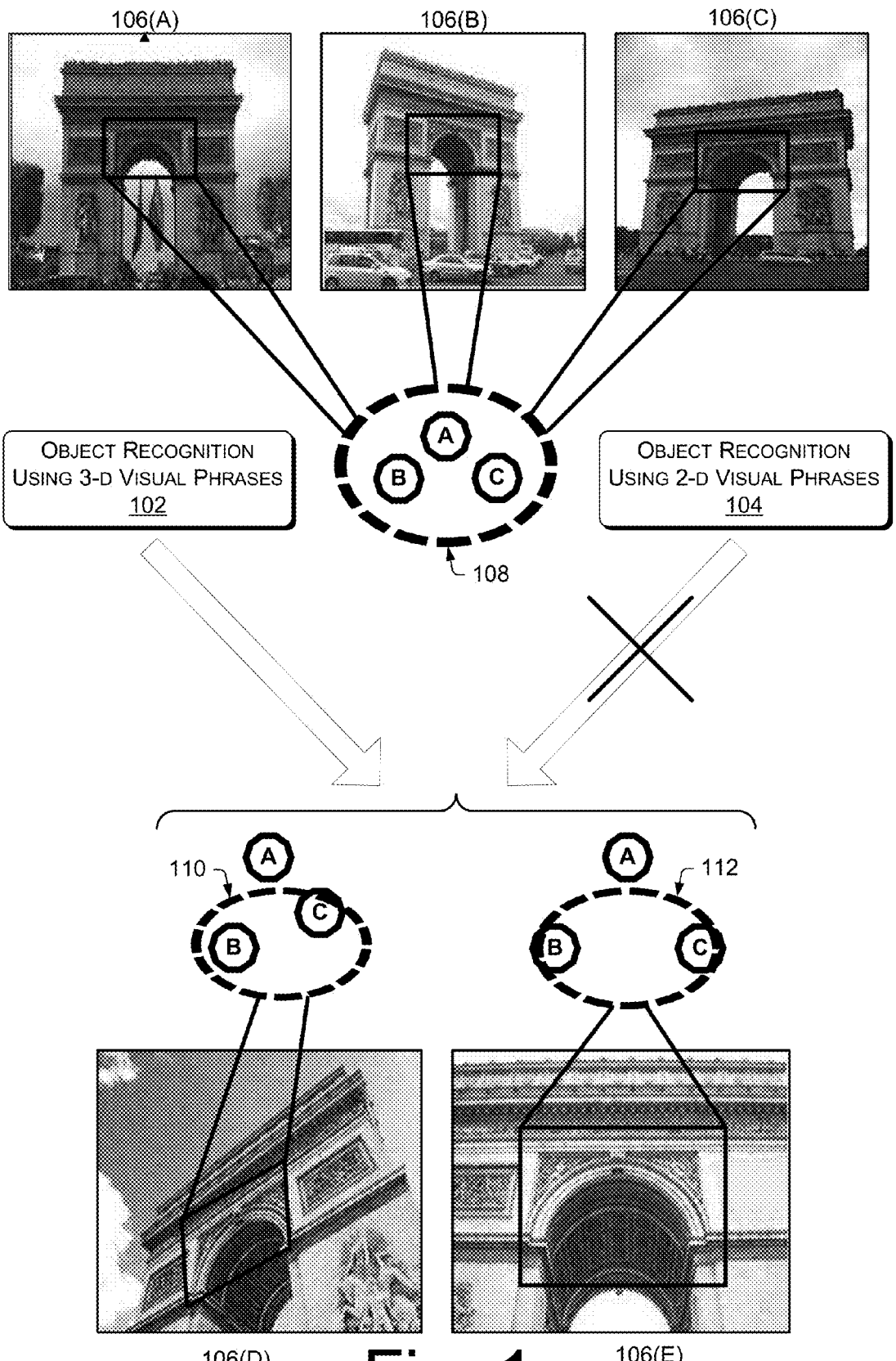
FIG. 1 illustrates an example overview of the techniques discussed herein, in accordance with various embodiments described.

FIG. 1 provides an example of the how object recognition using 3-D visual phrases 102 improves the conventional object recognition approaches that use 2-D visual phrases 104. For example, photos 106(A), 106(B), and 106(C) at the top of FIG. 1 are photos of the Arc de Triomphe (e.g., the object of recognition focus in the photos) taken from a similar point-of-view and a similar distance. Accordingly, elements A, B, and C which have been extracted from similar areas of each photo 106(A), 106(B), and 106(C) frequently co-occur within a local region in a 2-D image plane as indicated at 108 (e.g., the local region captured by the defined rectangle in each photo as tracked to the oval at 108). Conventional approaches to object recognition using 2-D visual phrases determine the local region by pre-defining a radius based on empirical or heuristic rules.

However, photos 106(D) and 106(E) at the bottom of FIG. 1 provide images of the same object (e.g., Arc de Triomphe) as photos 106(A), 106(B), and 106(C), but from a different point-of-view and/or from a different distance (e.g., noticeable and/or substantial differences). Accordingly, the same elements A, B, and C extracted from photo 106(D), as shown at 110, and the same elements A, B, and C extracted from photo 106(E), as shown at 112, do not align or co-occur within the pre-defined local region 108 discussed with respect to elements A, B, and C from photos 106(A), 106(B), and 106(C). Thus, as seen in FIG. 1, object recognition using 2-D visual phrases 104 will not correctly recognize or identify the object in photos 106(D) and 106(E) as the Arc de Triomphe (e.g., as indicated by the cross-out "X"). Consequently, the conventional approaches to object recognition using 2-D visual phrases 104 lacks robustness to viewpoint changes which are common over thousands of images of an object electronically available via the Internet, particularly when the images are photos taken by numerous different people from different positions.

As further discussed herein, object recognition using 3-D visual phrases 102 is more reliable because instead of identifying elements in a local region of a 2-D image plane, a 3-D visual phrase characterizes the intrinsic geometric structure of an object, and is robust against viewpoint changes. Accordingly, object recognition using 3-D visual phrases 102 will more likely recognize that photos 106(D) and 106(E) contain the object Arc de Triomphe as long as elements A, B, and C are visible somewhere in the image. In other words, elements A, B, and C do not have to be elements contained in a pre-defined local region when implementing object recognition using 3-D visual phrases 102, as seen at 110 and at 112 in FIG. 1.

The object recognition using 3-D visual phrases 102 discussed herein discovers 3-D visual phrases from a 3-D object model constructed using a set of images known to include the object of recognition focus (e.g., training images) by selecting candidate points on the 3-D object model that provide a comprehensive description of the complete object structure. The potential identification of these 3-D visual phrases in an unseen image will then recognize the object for classification and categorization purposes (e.g., accurate image-based retrieval for image-based searching). An example of an "unseen" image is a new or unclassified image (e.g., online photo) that may or may not contain an object that the techniques discussed herein can recognize. Based on the recognition of the object, the new or unclassified image can be classified or labeled appropriately.

Illustrative Architecture

Figure 2:
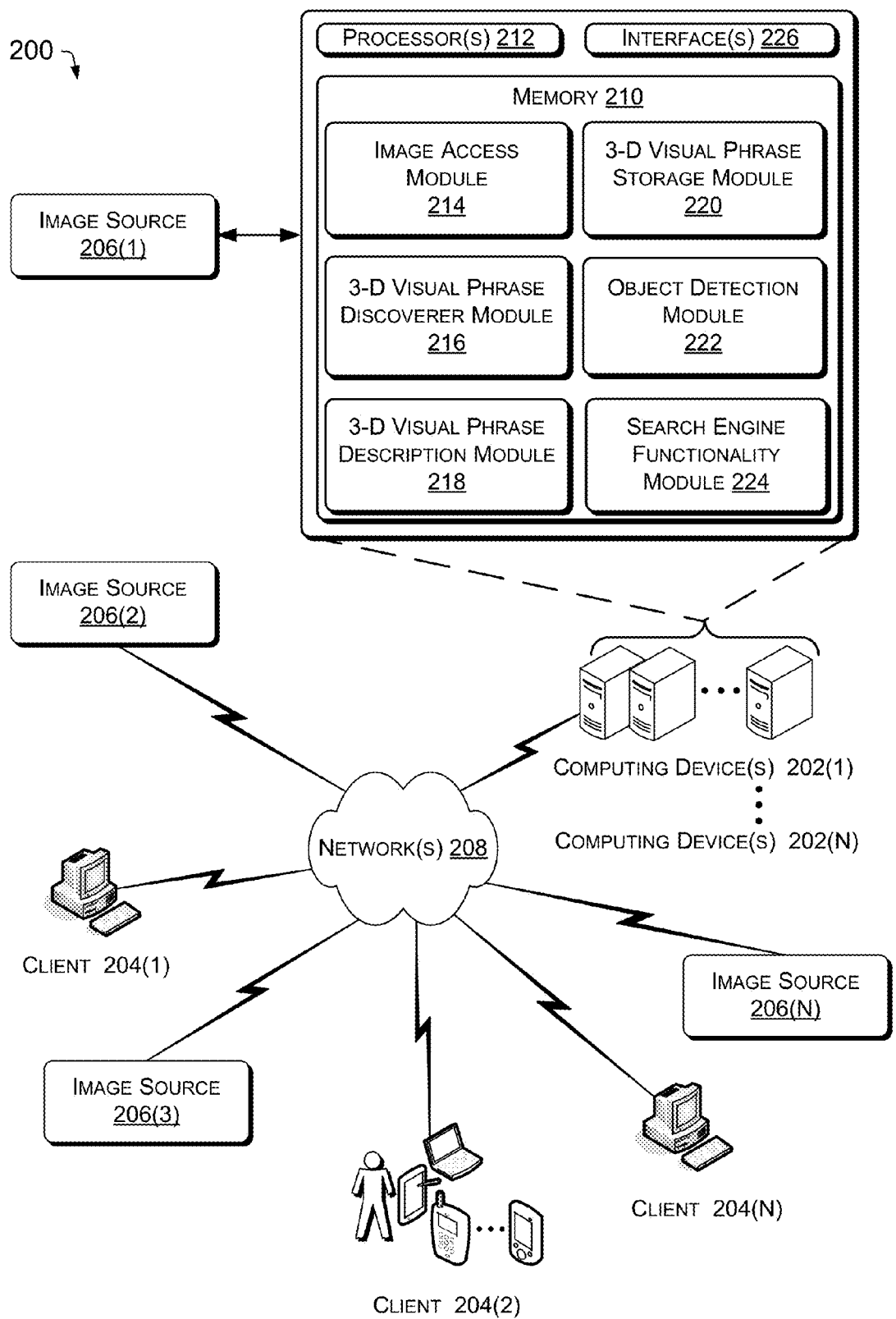
FIG. 2 illustrates example architecture for implementing the described techniques, in accordance with various embodiments.

FIG. 2 shows an illustrative architecture 200 that may employ the described techniques. To this end, architecture 200 includes one or more computing devices 202(1) . . . 202(N), one or more client devices 204(1) . . . 204(N), and one or more image sources 206(1) . . . 206(N), each coupled to network(s) 208. In various embodiments, the computing devices 202(1) . . . 202(N) may be server computing devices (e.g., a server farm) configured in accordance with image-based search functionality or any mechanism where object recognition in images may be used (e.g., Microsoft® Bing® search engine, Google® search engine, Yahoo® search engine, etc.). In various embodiments, a user may submit an image-based search query including one or more search query terms via a web browser or other application at the one or more client devices 204(1) . . . 204(N), such that the computing devices 202(1) . . . 202(N) may provide images to the user based on the object recognition using 3-D visual phrases discussed herein. Thus, the client devices 204(1) . . . 204(N) may comprise one of an array of computing devices capable of connecting to the one or more network(s) 208, such as a server computer, a client computer, a personal computer, a laptop computer, a mobile phone, a personal digital assistant (PDA), tablets, gaming consoles, set top boxes, and the like.

In various embodiments, the image sources 206(1) . . . 206(N) may be any computing device and/or electronic storage device that maintain digital images so that that the computing devices 202(1) . . . 202(N) can retrieve and/or provide the digital images for object recognition. In some instances, the digital images maintained at image sources 206(1) . . . 206(N) may be training images that are known to contain the object of recognition focus. The training images may be used to discover and describe the 3-D visual phrases. In some instances, the digital images maintained at image sources 206(1) . . . 206(N) may be unseen images where the 3-D visual phrases, once discovered and described, are used to determine or detect whether the object is present. As shown, image sources 206(1) . . . 206(N) may be locally accessible to computing devices 202(1) . . . 202(N), or image sources 206(1) . . . 206(N) may be remotely accessible to computing devices 202(1) . . . 202(N) via the network(s) 208.

In various embodiments, the architecture 200 can be the World Wide Web, including numerous PCs, servers, and other computing devices spread throughout the world. The computing devices 202(1) . . . 202(N), the client devices 204(1) . . . 204(N), and the image sources 206(1) . . . 206(N) may be coupled to each other in various combinations through a wired and/or wireless network 208, including a LAN, WAN, or any other networking and/or communication technology.

The computing devices 202(1) . . . 202(N) comprise a memory 210 and one or more processors 212. Furthermore, in various embodiments, the computing devices 202(1) . . . 202(N) include an image access module 214, a 3-D visual phrase discoverer module 216, a 3-D visual phrase description module 218, a 3-D visual phrase storage module 220, an object detection module 222, and a search engine functionality module 224. Furthermore, the computing devices 202(1) . . . 202(N) may include one or more network interface(s) 226 for network communication.

The processor(s) 212 may be a single processing unit or a number of units, all of which could include multiple computing units. The processor(s) 212 may be implemented as one or more microprocessors, microcomputers, microcontrollers, digital signal processors, central processing units, state machines, logic circuitries, shared-memory processors, and/or any devices that manipulate signals based on operational instructions. Among other capabilities, the processor(s) 212 may be configured to fetch and execute computer-readable instructions stored in the depicted modules and/or memory 210.

The memory 210 may comprise computer-readable media including, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing or server device.

In contrast, communication media may embody computer readable instructions, data structures, program modules, or other data in a modulated data signal, such as a carrier wave, or other transmission mechanism. As defined herein, computer storage media does not include communication media.

The network interface(s) 226 enable network communication, and may include one or more ports for connecting the respective computing device to the network(s) 208. The network interface(s) 226 can facilitate communications within a wide variety of networks and protocol types, including wired networks (e.g. LAN, cable, etc.) and wireless networks (e.g., WLAN, cellular, satellite, etc.). For instance, the network interface(s) 226 may access, over network(s) 208, image data stored at the image sources 206(1) . . . 206(N). In various embodiments, computing device(s) 202(1) . . . 202(N) may have local access, independent of a network connection, to image sources 206(1) . . . 206(N).

It is understood in the context of this document, that the functionality performed by the image access module 214, the 3-D visual phrase discoverer module 216, the 3-D visual phrase description module 218, the 3-D visual phrase storage module 220, the object detection module 222, and the search engine functionality module 224 may be all inclusive on a single computing device 202(1), or spread out amongst a plurality of computing device(s) 202(1) . . . 202(N) connected to one another via network(s) 208. Moreover, in various embodiments some of the functionality may be performed by similar elements at the image sources 206(1) . . . 206(N).

In various embodiments, the image access module 214 is configured to access or retrieve a collection of images, $\Gamma$, known to include a particular object of recognition focus (e.g., a popular and/or frequently visited and photographed landmark). For example, the image access module 214 may retrieve hundreds or thousands of images of Big Ben. These images may be referred to as training images based on some sort of indication or tag stating that the image includes the object of focus (e.g., human review, metadata information, caption information, etc.).

Figure 3:
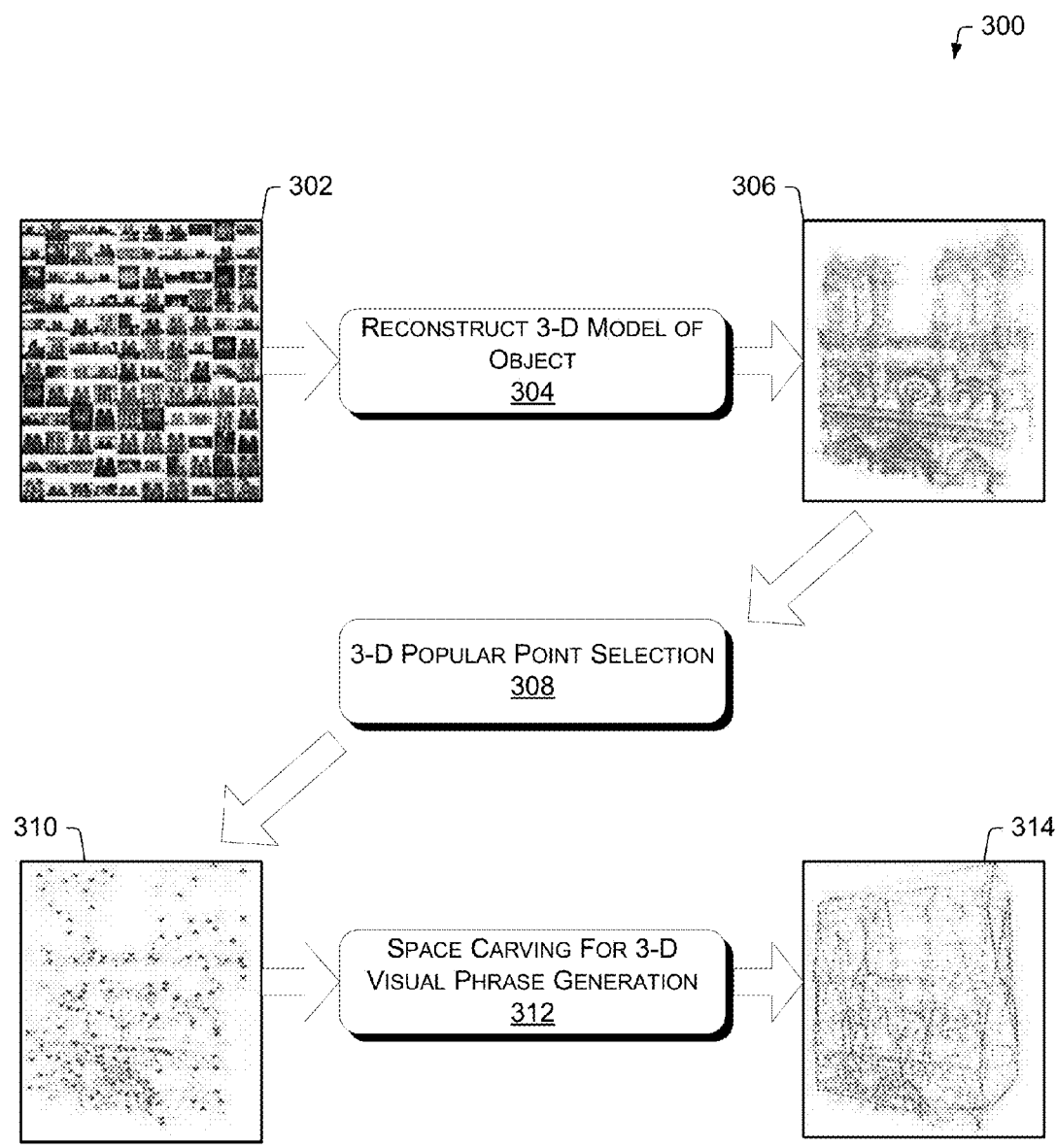
FIG. 3 illustrates an example diagram that generates 3-D visual phrases, in accordance with various embodiments.

Once a collection of images $\Gamma$ for a particular object of focus is retrieved, in various embodiments, the 3-D visual phrase discoverer module 216 performs 3-D visual phrase discovery, as depicted in FIG. 3. The collection of images $\Gamma$ for a particular object is depicted at 302. The 3-D visual phrase discoverer module 216 uses the collection of images $\Gamma$ to reconstruct a 3-D model of the particular object, as depicted at 304. In various embodiments, the 3-D model is a 3-D point cloud 306 and the 3-D visual phrase discoverer module 216 uses structure-from-motion (SfM) techniques to reconstruct the 3-D point-cloud 306. The 3-D point cloud includes a set of 3-D points P for the particular object of recognition focus. The 3-D visual phrase discoverer module 216 may also obtain an estimated camera pose (e.g., viewpoint of object, distance to object, direction, etc.) for each image in the collection of images $\Gamma$ under the same universal coordinate system that defines the 3-D point cloud.

Accordingly, for each 3-D point p∈P, the 3-D visual phrase discoverer module 216 denotes $\Gamma_p \subset \Gamma$ as the set of images in which p is observed and/or registered during SfM. Thus, the popularity of p within the 3-D point cloud is defined as the cardinality of $\Gamma_p$.

In various embodiments, once the 3-D point cloud 306 of the particular object is reconstructed, the 3-D visual phrase discoverer module 216 selects popular 3-D points that maintain a broad spatial coverage of the 3-D point cloud 306, as depicted at 308. A 3-D point cloud reconstructed from thousands of images in the collection of images $\Gamma$ may contain tens of thousands of 3-D points p which are frequently redundant for rigid objects (e.g., popular landmarks). Moreover, individual points p may vary in popularity. For example, a point may be included in a few images or in hundreds of images. Therefore, the 3-D visual phrase discoverer module 216 attempts to select a subset of points that will most likely contribute to recognizing or identifying the particular object in an unseen image. In doing so, the 3-D visual phrase discoverer module 216 considers two selection criteria, point popularity and spatial coverage of the 3-D point cloud model 306.

In order to select the most popular 3-D points, in various embodiments, the 3-D visual phrase discoverer module 216 samples the points P in the point cloud 306 at a given sampling rate η by constructing an octree to represent a 3-D bounding cube of P. Then the 3-D visual phrase discoverer module 216 iteratively partitions the most dense (e.g., containing the most 3-D points) volumetric pixel element (i.e., voxel) until obtaining η×|P| non-empty voxels. The 3-D visual phrase discoverer module 216 then selects the most popular 3-D point in each obtained non-empty voxel to compose a popular point subset $P_\eta$ 310 of the 3-D point cloud 306.

In various embodiments, the 3-D visual phrase discoverer module 216 uses each point in the popular point subset $P_\eta$ 310 as a visual element, and generates 3-D visual phrases by combining several popular points into groups. However, arbitrary combination of popular points into groups suffers from a large number of available popular points which results in numerous combinations, and lacks the capability to fully cover an object structure.

Thus, the 3-D visual phrase discoverer module 216 generates 3-D visual phrases from triangular facets that compose the surface of the 3-D object model represented by the popular point subset $P_\eta$ 310. Advantages of using triangular facets that compose the surface of the 3-D object model include: i) each triangular facet corresponds to a local spatial structure of the object and consequently has sound visibility and repeatability in unseen images, ii) the triangular facets combined approximate the 3-D surface and provide full spatial coverage of the object, and iii) the triangular facets construct a compact set with the same order of magnitude as the 3-D points in the 3-D point-cloud 306.

In various embodiments, the 3-D visual phrase discoverer module 216 may approximate the object surface using a number of Delaunay triangles. Thus, the 3-D visual phrase discoverer module 216 conducts Delaunay triangulation on the convex hull that envelopes a given 3-D popular point set. Then, at 312, the 3-D visual phrase discoverer module 216 refines the surface using space carving techniques that iteratively remove false facets which occlude any points visible from empirical images. Thus, each triangular facet on the resulting surface 314 is a 3-D visual phrase that includes three 3-D popular points representing a particular geometric structure of the object.

In various embodiments, the 3-D visual phrase discoverer module 216 considers the scale of the particular objects in the collection of images when discovering the 3-D visual phrases. For example, an object may be photographed from different distances, with different image capture focal lengths, resulting in various sizes of the same object in different photographs. Meanwhile, each facet on an object may only be visible in a proper scale range. For instance, a small facet may be too local to be identified in a long shot image; while a large facet cannot completely appear in a close-up image where the object is only partially observed.

Accordingly, in various embodiments, the 3-D visual phrase discoverer module 216 may generate multi-scale 3-D visual phrases. The fewer number of 3-D points selected at 308 will generate larger-scaled triangular facets. Thus, the 3-D visual phrase discoverer module 216 may vary the sampling rate η (e.g., 1%, 2%, 4%, etc.) to generate multi-scale 3-D visual phrases. For example, a 1% sampling rate η may provide a "sparse" 3-D model represented by the popular point subset $P_\eta$ 310 and correspond to a "long shot" photograph of the object. A 2% sampling rate η may provide a "moderate" 3-D model represented by the popular point subset $P_\eta$ 310 and correspond to a "medium shot" photograph of the object. A 4% sampling rate η may provide a "dense" 3-D model represented by the popular point subset $P_\eta$ 310 correspond to a "close-up shot" photograph of the object.

Thus, the multi-scale 3-D visual phrases may describe the same objects at different granularity levels, which further aids in the object recognition process.

After discovering the 3-D visual phrases for an object, the 3-D visual phrase description module 218 describes a visual appearance and geometric structure to characterize each 3-D visual phrase. The 3-D visual phrase description module 218 seeks to preserve as much information as possible to ensure the recall of the 3-D visual phrases in unseen image data (e.g., individual photographs retrieved from image sources 206(1) . . . 206(N)), and simultaneously maintain sufficient constraints to filter out false detections. In other words, the 3-D visual phrase detection process further discussed herein relies on 3-D visual phrase characterization to distinguish true occurrences from false positives with respect to object recognition.

As previously discussed, each 3-D visual phrase is a triangular facet with three points (e.g., vertex points). Thus, each 3-D visual phrase may be characterized based on i) a visual appearance of each vertex point, and ii) geometric structure among the three vertex points. During the detection of the 3-D visual phrase in an unseen image, the visual appearances of each vertex point provide relaxed criteria to recall true positives while the geometric structure among the three vertex points serves as a constraint to remove false positives and boost precision of the detection.

Accordingly, in various embodiments, the 3-D visual phrase description module 218 describes the visual appearance of each of the vertex points p for a discovered 3-D visual phrase, so that matching can occur with similar points, $p_{sim}$, in unseen images. In order to do this, the 3-D visual phrase description module 218 may use SIFT features as an appearance description to points in the collection of images $\Gamma_p$ (e.g., the training images), where each SIFT feature, f, is characterized by a 128-dimensional descriptor, des(f), extracted from a local image patch in scale, scl(f). Each 3-D point p∈P appears in the collection of images, $\Gamma_p$, and consequently matches with a set of SIFT features $F_p$ (e.g., one per image).

A straightforward visual appearance description of p is the mean descriptor averaged over SIFT features in $F_p$. However, the raw $F_p$ may be insufficient to provide a comprehensive description of the 3-D point p, because 3-D reconstruction relies on point matching which may lead to two different kinds of mismatches. First, one physical object point would be over-split into multiple 3-D points close to one another during SfM if the corresponding SIFT features fail to match due to descriptor variation under viewpoint and/or illumination changes (e.g., photograph capture variations). Second, a 3-D point may be visible in some images but the corresponding SIFT features may not be registered to the 3-D model due to appearance variation.

Thus, in various embodiments, the 3-D visual phrase description module 218 compensates for the aforementioned loss in the observations of the 3-D points' visual appearance by expanding $F_p$. To expand $F_p$, the 3-D visual phrase description module 218 re-projects each 3-D point p to the 2-D images in which it is visible, based on camera poses estimated during SfM. Then, the 3-D visual phrase description module 218 may append a SIFT feature to $F_p$ when it is sufficiently close to a re-projected 2-D position (e.g., within a maximum deviation setting of two pixels).

To further describe the visual appearance of a 3-D point, p, the 3-D visual phrase description module 218 may compress the expanded $F_p$ by clustering descriptors and preserving a set of mean descriptors, $A_p$, calculated from the L=3 largest clusters. In various embodiments, clustering means identifying or finding similar descriptors according to Euclidean distance. A descriptor is a vector of N-dimensions, and two descriptors with a close Euclidean distance are considered to be similar, and may be compressed through the clustering process.

In various embodiments, the 3-D visual phrase description module 218 describes a geometric structure of the three 3-D points (e.g., vertex points) in each 3-D visual phrase (e.g., a triangular facet). To distinguish true 3-D visual phrases in unseen images from false ones, the 3-D visual phrase description module 218 preserves inter-point geometric structures as i) constraints for rejecting false positives which violate particular geometric properties, and ii) criteria for ranking candidates by consistency to stabilize statistics from the observed data in the unseen images.

For example, given a 3-D visual phrase containing three vertex points, denoted as $v=(p_1, p_2, p_3)$, the 3-D visual phrase description module 218 characterizes the cyclic order of the three vertex points, which is a robust property. In particular, the 3-D visual phrase description module 218 defines a direction around the perimeter of v based on its outer-pointing surface normal and the right-hand rule. Along this direction, the 3-D visual phrase description module 218 can define the cyclic order of the three vertex points for each 3-D visual phrase. The cyclic order may be invariant to projective transformations in the sense that a 2-D observation of the 3-D visual phrase (i.e., a triplet of SIFT features as projections of the three vertex points) will maintain order. Thus, the cyclic order provides a rigid criterion to distinguish false positives from true occurrences of the 3-D visual phrase when performing object detection in an unseen image.

In various embodiments, the 3-D visual phrase description module 218 describes a geometric structure by considering correlations between the scales and pair-wise distances of 3-D points' 2-D projections from various view points. These scale-distance correlations provide a flexible geometric property. The 3-D visual phrase description module 218 may use a projective-robust measure to characterize the scale-distance correlation between a pair of 3-D points.

For example, SIFT features $f_1$ and $f_2$ may be projections of two 3-D points $p_1$ and $p_2$, respectively. The 2-D distance between $f_1$ and $f_2$ may then be denoted as, $d_{1,2}=dist(f_1, f_2)$, and the respective scales may be denoted as $scl(f_1)$ and $scl(f_2)$. Accordingly, the 3-D visual phrase description module 218 may define a ratio measure as follows, $$R(f_1, f_2) \triangleq \frac{(d_{1,2} + scl(f_1)) \times (d_{1,2} + scl(f_2))}{d_{1,2} \times (d_{1,2} + scl(f_1) + scl(f_2))}. \quad \text{Equ. (1)}$$

The 3-D visual phrase description module 218 can tolerate errors in SIFT scale estimation under projective transformations by averaging the calculated R values over all images in which both the points, $p_1$ and $p_2$, are observed, yielding a Gaussian distribution with mean $\mu_R(p_1, p_2)$ and standard deviation $\sigma_R(p_1, p_2)$.

Once a set of 3-D visual phrases V for a particular object has been discovered and described, the 3-D visual phrase storage module 220 stores the set V in a database or memory so that it can be used to detect the particular object in unseen images. For example, the 3-D visual phrase storage module 220 may store a set of 3-D visual phrases for each of numerous different landmarks.

Figure 4:
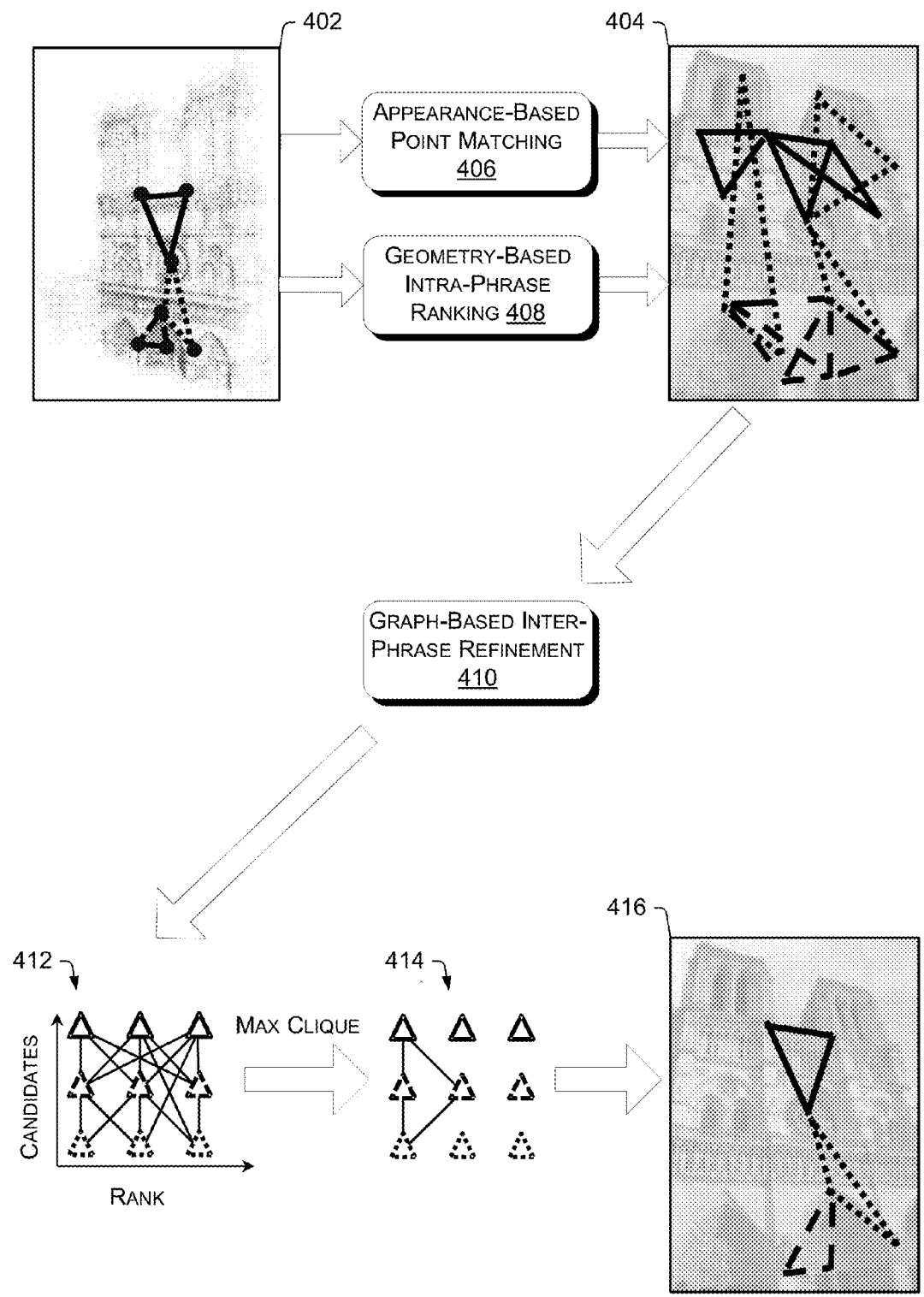
FIG. 4 illustrates an example diagram that detects objects using 3-D visual phrases, in accordance with various embodiments.

Then, in various embodiments, the object detection module 222 uses a given set of 3-D visual phrases V for a particular object to detect and/or recognize a version of the particular object in a query image $I_q$ (e.g., an unseen image retrieved from images sources 206(1) . . . 206(N)), as discussed herein with respect to FIG. 4.

For example, the given set of 3-D visual phrases V is depicted at 402 (e.g., three 3-D visual phrases distinguishable by a solid line, a dotted line, and a more frequently dotted line). The query image $I_q$ is depicted at 404. The object detection module 222 is configured to extract SIFT features from the query image $I_q$ 404 and match the 3-D points comprising the 3-D visual phrases in V 402 with the extracted SIFT features from the query image $I_q$ 404 based on visual appearance (e.g., the appearance-based point matching 406). To ensure the proper recall of true 3-D visual phrases in the query image $I_q$ 404, the object detection module 222 uses multiple SIFT features as candidates for each 3-D point because, in some instances, the most visually similar SIFT features may not be the real projections of 3-D points.

Since the 3-D visual phrase description module 218 has previously characterized the appearance of each 3-D point p in V as a set of $A_p$ SIFT descriptors (e.g., a mean set), the object detection module 222 may define the appearance similarity of a SIFT feature f (from the query image $I_q$) to p based on a cosine similarity as follows, $$sim_{app}(f; p) = \max_{a \in A_p} \cos(des(f), a). \quad \text{Equ. (2)}$$

For each 3-D point in the query image, the object detection module 222 may preserve up to a top N (e.g., three) candidate SIFT features with appearance similarity above an empirical threshold (e.g., $\alpha=0.8$) to control a tradeoff between the recall of 3-D visual phrases and the scale of a solution space. Moreover, in an embodiment, the appearance-based point matching may be accelerated by an approximate nearest neighbor search.

In various embodiments, the object detection module 222 may also perform geometry-based intra-phrase ranking at 408. For example, after matching 3-D points from V with the SIFT features extracted from the query image $I_q$, the object detection module 222 may obtain a set V' of 3-D visual phrases where each of the three vertex points in an individual 3-D visual phrase has matched with at least one feature. Since there may be multiple candidate features per point, each visual phrase in V' may have multiple candidates (e.g., two, four, ten, twenty, and so forth), although three for each visual phrase are distinguishably depicted in the query image 404 (e.g., a total of nine triangles). However, only one of the candidates may be a true occurrence corresponding to the actual 3-D visual phrases depicted in V 402. Thus, the object detection module 222 may boost the signal-to-noise ratio for subsequent processing by considering the described (e.g., known) geometric structure of each 3-D visual phrase as described by the 3-D visual phrase description module 218 to filter the candidates and eliminate the false positives that have different geometric structures.

For example, as discussed, an individual 3-D visual phrase $v=(p_1, p_2, p_3)$ in V' may correspond to a set of candidates C based on the appearance-based point matching 406. Each candidate c is a triplet of SIFT features. Therefore, the object detection module 222 may denote $c=(f_1, f_2, f_3)$, where $f_i$ is a SIFT feature considered as a candidate projection of $p_i$. In order to filter the set of candidates C, the object detection module 222 compares the cyclic order of features in each candidate c with the standard order $o_v$ in the 3-D visual phrase v. Consequently, the object detection module 222 can discard any candidate with a different order, and for each remaining candidate c, the object detection module 222 may calculate a geometric similarity score to rate a degree to which c has a similar scale-distance correlation to v, as follows, $$sim_{geo}(c; v) = \exp\left(-\mathcal{T} \sum_{(i,j) \in \varepsilon} \frac{(R(f_i, f_j) - \mu_R(p_i, p_j))^2}{\sigma_R^2(p_i, p_j)}\right). \quad \text{Equ. (3)}$$

Here, $\mathcal{T}$ is a positive coefficient set to 0.1 and $\varepsilon=\{(1,2),(2,3),(3,1)\}$, which enumerates the pairs of 3-D points in the 3-D visual phrase v. The object detection module 222 can then rank the candidates according to an overall similarity, as follows, $$sim_{overall}(c; v) = sim_{geo}(c; v) \times \prod_{i=1}^{3} sim_{app}(f_i; p_i). \quad \text{Equ. (4)}$$

Thus, equation (4) serves as a confidence indicator that candidate c is a true occurrence of v. In various embodiments, the object detection module 222 truncates the candidate ranking list of each visual phrase v to retain the top most candidates (e.g., M=5) with a confidence exceeding a threshold (e.g., $\beta=0.2$).

In various embodiments, the object detection module 222 may then perform graph-based inter-phrase refinement at 410. The object detection module 222 uses graph-based inter-phrase refinement 410 because although a large proportion of false visual phrase candidates can be filtered out by the geometry-based intra-phrase ranking discussed above, some false candidates may still remain. Accordingly, the object detection module 222 may further eliminate these remaining false candidates by considering relationships between candidates for different 3-D visual phrases.

Therefore, the object detection module 222 may build an undirected graph as shown at 412, where each node is a 3-D visual phrase candidate and each edge exists if the two candidates that it connects to can be true 3-D visual phrase occurrences simultaneously. For example, subsequent to obtaining a set of candidates for each 3-D visual phrase (e.g., the three candidates for each of the three 3-D visual phrases as shown in 404), the object detection module 222 may organize the candidates, each as a node, in an undirected graph where each candidate is a node (e.g., there are nine nodes shown in three rows at 412, where the three nodes in the first row denote candidates for the first 3-D visual phrase and so forth). Then the object detection module 222 attempts to connect (e.g., build an edge between) any two nodes if the two nodes have a possibility to simultaneously co-occur as two distinct 3-D visual phrases, as discussed herein.

Simultaneous co-occurrence is feasible when the two candidates satisfy each of the following criteria: i) the two candidates cannot lead to ambiguity in point-to-feature matching (e.g., one 3-D point matching with multiple SIFT features or vice versa), and ii) as 2-D triangles, the two candidates cannot have overlapping coverage areas of the object in the query image. In various embodiments, these criteria always hold for true projections of 3-D visual phrases since the projections are components of a non-overlapping coverage of an object surface.

Therefore, within the undirected graph 412, the object detection module 222 may include the true candidates in a clique which indicates that there is not conflict between the included candidates, thereby justifying their co-occurrence. A clique is a subset of nodes in the graph fully connected by edges. Moreover, the object detection module 222 locates the true candidates by finding a maximum clique in the undirected graph 412 and then harvesting the member nodes of the maximum clique. For example, the object detection module 222 uses an approximation solution that relies on the confidence of each node being a true 3-D visual phrase occurrence. In various embodiments, the confidence of a node is a measured by a number of nodes that are connected to the node. Starting from the most confident node based on the ranking, the object detection module 222 iteratively selects the next most confident node that is connected to all the selected confident nodes until no more nodes can be added.

Thus, a set of most likely 3-D visual phrase occurrences are finally identified at 414 and 416 and serve as 3-D to 2-D matches for object recognition (e.g., the discovered and described 3-D visual phrases matching the extracted SIFT features from a 2-D unseen image).

Illustrative Processes

Figure 5:
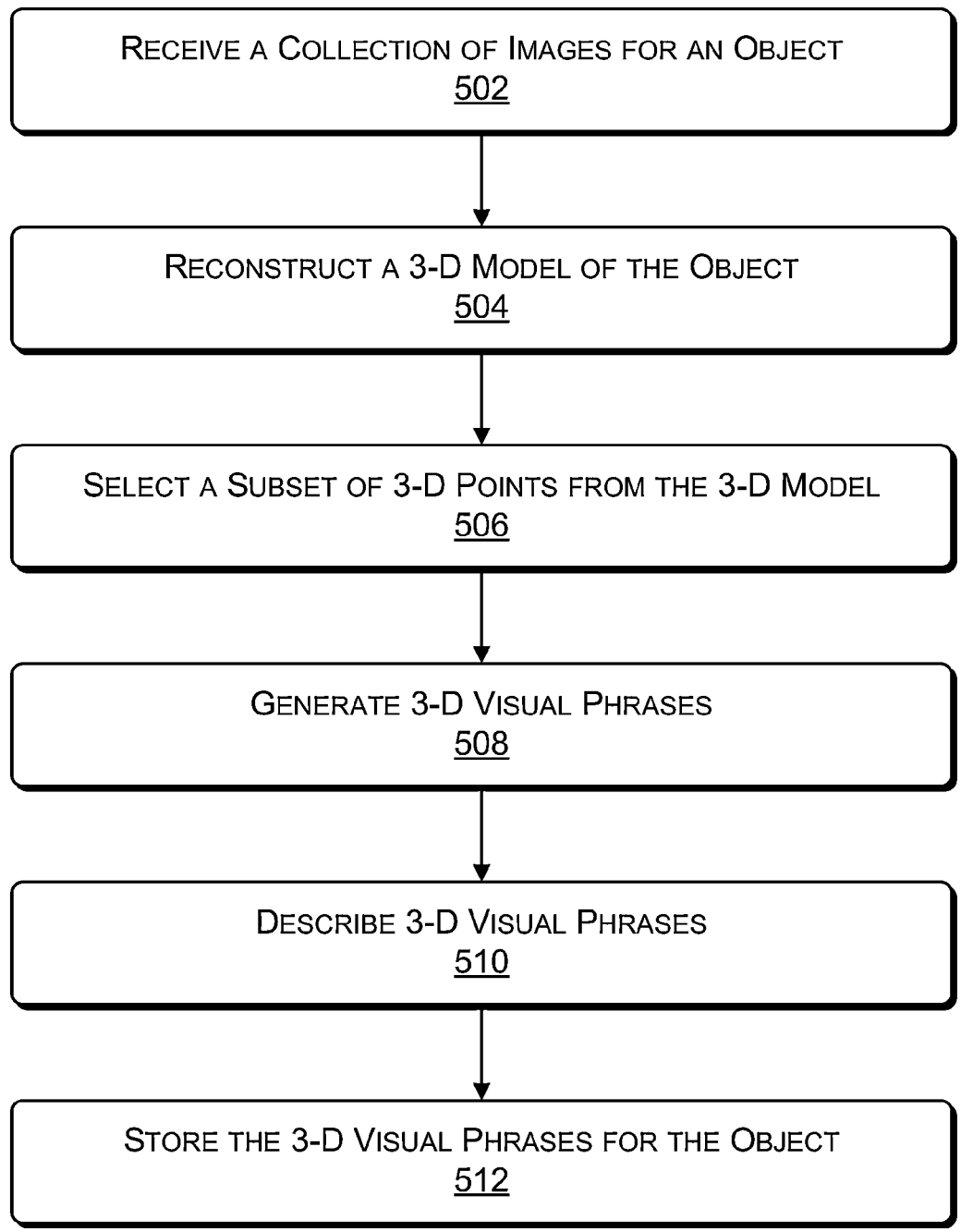
FIG. 5 illustrates an example process that determines 3-D visual phrases in accordance with the techniques discussed herein.
Figure 6:
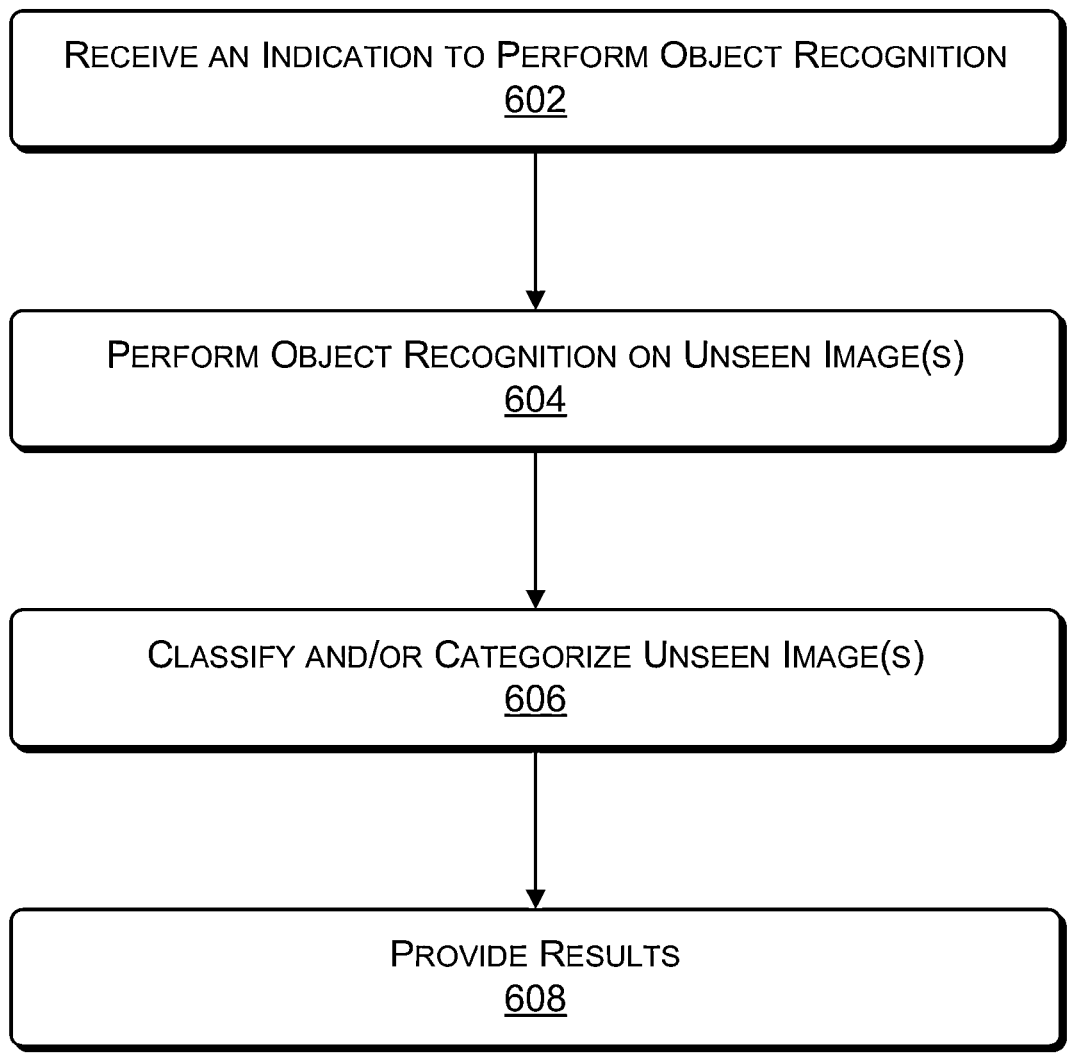
FIG. 6 illustrates an example process that uses 3-D visual phrases to recognize objects in an image in accordance with the techniques discussed herein.

Example operations are described herein with reference to FIG. 5 and FIG. 6. The processes are illustrated as logical flow graphs, which represent a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 5 illustrates an example process 500 for discovering and describing 3-D visual phrases based on a collection of images for a particular object of recognition focus. The example process 500 may be performed for multiple different rigid objects (e.g., popular landmarks frequently photographed).

At operation 502, the image access module 214 receives a collection of images $I$ 302 for a particular object. The collection of images may include hundreds or thousands of photos of the particular object captured from different distances and/or viewpoints.

At operation 504, the 3-D visual phrase discoverer module 216 reconstructs a 3-D model of the particular object. This operation is also depicted at 304 in FIG. 3. In various embodiments, the reconstructed 3-D model of the particular object is a 3-D point cloud 306 reconstructed using SfM techniques.

At operation 506, the 3-D visual phrase discoverer module 216 selects popular 3-D points from the 3-D point model (e.g., a popular point subset). This operation is also depicted at 308 in FIG. 3. The 3-D visual phrase discoverer module 216 selects 3-D points that will most likely aid in identifying and detecting the object in unseen images. Moreover, in various embodiments, the 3-D visual phrase discoverer module 216 may select popular 3-D points according to a set sampling rate.

At 508, the 3-D visual phrase discoverer module 216 generates 3-d visual phrases by combining the 3-D points into groups. At 510, the 3-D visual phrase discoverer module 218 provides a comprehensive description of the discovered 3-D visual phrases by characterizing the discovered 3-D visual phrases for the particular object. In various embodiments, the characterization includes visual appearance characterization and geometric structure characterization.

At 512, the 3-D visual phrase storage module 220 stored a set of 3-D visual phrases for the particular objects so that they can be used for object recognition in unseen images.

FIG. 6 illustrates an example process 600 that uses the stored 3-D visual phrases discovered and described in FIG. 5 to recognize the particular object in an unseen image.

At operation 602, the object detection module 222 receives an indication to perform object recognition. In various embodiments, the indication may come from the search engine functionality module 224 conveying a user query that specifies an image-based search request from one of the client devices 204(1) ... 204(N). In other embodiments, the indication may be an automatic indication (e.g., periodic) where the object detection module 222 is configured to detect objects in a number of unseen images accessed by the image access module 214 via the one or more image sources 206(1) ... 206(N).

At operation 604, the object detection module 222 receives an unseen image and performs object recognition, as discussed above with respect to FIG. 4. (e.g., using the appearance-based point matching 406, the geometry-based intra-phrase ranking 408, and the graph-based inter-phrase refinement). In various embodiments, operation 604 is performed for numerous unseen images accessed via the one or more image sources 206(1) ... 206(N). Moreover, the object detection module 222 may cycle through multiple different sets of stored 3-D visual phrases V associated with different objects. For example, if the object detection module 222 determines that an unseen image does not include 3-D visual phrases in a first set V associated with a first object (i.e., the unseen image does not include the object), then the object detection module 222 may then move on to determine if the unseen image includes a second object associated with a second set of 3-D visual phrases V. The object detection module 222 may do this until a match is found or until it is determined that the unseen image does not include an object for which a set of 3-D visual phrases is stored.

At operation 606, the object detection module 222 uses the results of the object recognition process to classify and/or categorize the image(s) according to the object (or objects) it contains.

At operation 608, a portion of the images classified and/or categorized for a particular object may be provided as results. For example, the search engine functionality module 224 may provide image-based search results (e.g., a select number of images with Big Ben) to the client devices 204(1) ... 204(N). In another example, images and/or photos classified and categorized according to the object detection techniques discussed herein may be provided to geo-localization applications or tourist guide applications.

Conclusion

Although the subject matter has been described in language specific to structural features and/or methodological acts, it is to be understood that the subject matter defined in the appended claims is not necessarily limited to the specific features or operations described above. Rather, the specific features and operations described above are described as examples for implementing the claims.

The invention claimed is:

1. A method comprising:
under control of a processor configured with computer-executable instructions,
receiving a collection of images each containing an object;
constructing a three-dimensional (3-D) model of the object, the 3-D model including a plurality of points;
determining a popularity of individual points in the plurality of points, wherein the popularity of an individual point is based at least in part on a number of images of the collection of images in which the individual point is observed;
selecting, based at least in part on a first sampling rate, a first popular point subset of the plurality of points based at least in part on the popularities of the respective individual points in the plurality of points;
selecting, based at least in part on a second sampling rate different than the first sampling rate, a second popular point subset of the plurality of points based at least in part on the popularities of the respective individual points in the plurality of points;
generating one or more 3-D visual phrases based on the first popular point subset of the plurality of points and the second popular point subset of the plurality of points; and
using the one or more 3-D visual phrases to detect the object in an unclassified image.

2. The method recited in claim 1, wherein a 3-D visual phrase is a triangular facet on a surface of the 3-D model.

3. The method recited in claim 1, further comprising describing each of the one or more 3-D visual phrases by characterizing a visual appearance of each point in the 3-D visual phrase.

4. The method recited in claim 1, further comprising describing each of the one or more 3-D visual phrases by characterizing a geometric structure of points in the 3-D visual phrase.

5. The method recited in claim 1, wherein using the one or more 3-D visual phrases to detect the object in the unclassified image comprises matching visual appearances of one or more points in the one or more 3-D visual phrases with scale-invariant feature transform (SIFT) features extracted from the unclassified image.

6. The method recited in claim 1, wherein using the one or more 3-D visual phrases to detect the object in the unclassified image comprises comparing a geometric structure of each 3-D visual phrase to a cyclic order of features extracted from the unclassified image.

7. The method recited in claim 1, wherein the collection of images is a set of training images known to include the object.

8. The method recited in claim 1,
determining the first sampling rate such that the one or more 3-D visual phrases can detect the object in a photograph where the object and a camera are separated by a first distance; and
determining the second sampling rate so that the one or more 3-D visual phrases can detect the object in another photograph where the object and the camera are separated by a second distance that is greater than the first distance.

9. The method recited in claim 1, wherein the object is a landmark and the collection of images is received from multiple different locations on a network.

10. The method recited in claim 1, further comprising storing the one or more 3-D visual phrases for object recognition.

11. One or more computer storage media storing computer executable instructions that, when executed, perform operations comprising:
sampling a plurality of points of a 3-D model of an object to determine a popular point subset, wherein each point of the popular point subset is sampled based on a number of training images in which the point is observed;
generating one or more sets of three-dimensional (3-D) visual phrases based on the popular point subset;
storing the one or more sets of 3-D visual phrases, each set of 3-D visual phrases being associated with the object;
receiving an indication to perform object recognition for one or more images;
performing object recognition on the one or more images using the one or more sets of 3-D visual phrases; and
categorizing the one or more images based on whether the object is recognized in an image using the one or more sets of 3-D visual phrases.

12. The one or more computer storage media recited in claim 11, wherein the indication is based on an image-based search query received from a client device.

13. The one or more computer storage media recited in claim 12, further performing an operation comprising providing image-based search results that include at least one of the one or more categorized images associated with the image-based search query.

14. A system comprising:
one or more processors;
one or more computer memories, coupled to the one or more processors and storing:
an image access module, operable by the one or more processors, to access a plurality of images that each comprise an object;
a three-dimensional (3-D) visual phrase discoverer module, operable by the one or more processors, to:
sample a plurality of points of a 3-D point cloud for the object to determine a popular point subset, wherein an individual point of the popular point subset is sampled based on a number of the plurality of images in which the individual point is observed; and
discover one or more 3-D visual phrases from the 3-D point cloud for the object based at least in part on the popular point subset; and
an object detection module, operable by the one or more processors, to receive an indication to perform object recognition for one or more additional images and to use the one or more 3-D visual phrases to recognize the object in individual ones of the one or more additional images.

15. The system as recited in claim 14, wherein the three-dimensional (3-D) visual phrase discoverer module discovers the one or more 3-D visual phrases by constructing the 3-D point cloud for the object using the plurality of the images, and each 3-D visual phrase is a triangular facet on a surface of the 3-D point cloud.

16. The system as recited in claim 14, further comprising a 3-D visual phrase description module, operable by the one or more processors, to characterize the one or more 3-D visual phrases by describing a visual appearance for each point in an individual 3-D visual phrase and describing a geometric structure of all the points in the individual 3-D visual phrase.

17. The system as recited in claim 16, wherein the object detection module uses the one or more characterized 3-D visual phrases to recognize the object in the image by matching visual appearances of one or more points in the one or more characterized 3-D visual phrases with scale-invariant feature transform (SIFT) features extracted from the image.

18. The system as recited in claim 16, wherein the object detection module uses the one or more characterized 3-D visual phrases to recognize the object in the image by comparing a geometric structure of an individual 3-D visual phrase to a cyclic order of features extracted from the image.

19. The system as recited in claim 14, wherein the plurality of images are known to contain the object and the one or more additional images are not known to contain the object prior to operation of the object detection module.

20. The system as recited in claim 14, wherein the plurality of points are sampled based at least in part on a sampling rate selected based at least in part on a distance between the object and a camera for one or more of the plurality of images.

\* \* \* \* \*